(12) United States Patent
Ni et al.

(10) Patent No.: US 10,489,065 B2
(45) Date of Patent: Nov. 26, 2019

(54) PERFORMANCE RULES AND STORAGE UNITS

(71) Applicant: Hewlett-Packard Development Company, L.P., Houston, TX (US)

(72) Inventors: Zhaozhong Ni, Bellevue, WA (US); Siamak Nazari, Fremont, CA (US); Doug Cameron, Santa Cruz, CA (US); Ming Ma, Bellevue, WA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 483 days.

(21) Appl. No.: 14/765,107

(22) PCT Filed: Mar. 29, 2013

(86) PCT No.: PCT/US2013/034574
§ 371 (c)(1),
(2) Date: Jul. 31, 2015

(87) PCT Pub. No.: WO2014/158184
PCT Pub. Date: Oct. 2, 2014

(65) Prior Publication Data
US 2015/0370497 A1 Dec. 24, 2015

(51) Int. Cl.
*G06F 3/06* (2006.01)
*G06F 16/21* (2019.01)
*G06F 16/11* (2019.01)

(52) U.S. Cl.
CPC ............ *G06F 3/0619* (2013.01); *G06F 3/061* (2013.01); *G06F 3/0605* (2013.01); *G06F 3/067* (2013.01); *G06F 3/0643* (2013.01); *G06F 3/0665* (2013.01); *G06F 3/0689* (2013.01); *G06F 16/122* (2019.01); *G06F 16/217* (2019.01)

(58) Field of Classification Search
None
See application file for complete search history.

(56) References Cited

U.S. PATENT DOCUMENTS

| | | | |
|---|---|---|---|
| 7,636,801 B1 | 12/2009 | Kekre et al. | |
| 8,046,446 B1 | 10/2011 | Karr et al. | |
| 8,347,058 B1 | 1/2013 | Knight et al. | |
| 8,621,178 B1 * | 12/2013 | Lazar | G06F 12/0223 711/117 |
| 2002/0133669 A1 | 9/2002 | Narayan et al. | |
| 2004/0243699 A1 | 12/2004 | Koclanes et al. | |

(Continued)

OTHER PUBLICATIONS

International Search Report and Written Opinion, International Application No. PCT/US2013/034574, Date of Completion: Dec. 26, 2013, dated Dec. 26, 2013, pp. 1-10.

(Continued)

*Primary Examiner* — Edward J Dudek, Jr.
*Assistant Examiner* — Andrew Russell
(74) *Attorney, Agent, or Firm* — Hewlett Packard Enterprise Patent Department

(57) ABSTRACT

Disclosed herein are techniques for managing the performance of a storage system. A subset of a plurality of storage units is associated with a rule that specifies a number of input and output transactions and a number of bits per time unit. The associations are adjusted in accordance with a performance policy and changes in the subset of the plurality of storage units.

20 Claims, 2 Drawing Sheets

(56) References Cited

U.S. PATENT DOCUMENTS

| | | |
|---|---|---|
| 2005/0138285 A1 | 6/2005 | Takaoka et al. |
| 2008/0222311 A1 | 9/2008 | Lee et al. |
| 2009/0228535 A1 | 9/2009 | Rathi et al. |
| 2010/0070732 A1 | 3/2010 | Strutt |
| 2011/0289585 A1 | 11/2011 | Zaitsev |
| 2012/0036323 A1 | 2/2012 | Araki et al. |

OTHER PUBLICATIONS

Mary Lovelace et al., "IBM System Storage SAN Volume Controller Best Practices and Performance Guidelines," IBM, RedBooks, Dec. 2012, pp. 1-514 (i-xx; 1-490, book info 1-2), Third Edition, Copyright International Business Machines Corporation 2012, Available at: <redbooks.ibm.com/redbooks/pdfs/sg247521.pdf>.

Extended European Search Report received in EP Application No. 13879997.8, dated Sep. 30, 2016, 8 pages.

\* cited by examiner

PERFORMANCE RULES AND STORAGE UNITS

BACKGROUND

Software applications heretofore may access large amounts of data stored in a variety of storage devices from different manufacturers. Such storage devices may be distributed throughout a network. One way to cope with diverse storage devices is to generate a level of abstraction thereover to portray an appearance of a uniform file system. In such a file system, each volume may represent a group of homogenous storage devices. An administrator may configure a file system to meet certain performance objectives.

DETAILED DESCRIPTION

As noted above, an administrator may configure a file system to meet certain performance objectives. Thus, the configuration may specify the number of transactions the system may execute per a given unit of time and a number of bits the system may process per a given unit of time. However, a file system may encounter a workload that requires more transactions and processing than allowed by its configuration. While it may be possible to reconfigure the system to cope with higher future workloads, it may be hard to predict future workload demands. Furthermore, certain groups of storage units may experience higher workloads than others. Unfortunately, conventional techniques may only permit performance parameters to be specified at the highest level (e.g., file system level) or the lowest level (e.g., a single volume level). File systems heretofore may not permit performance configuration of intermediate levels, such as a group of overlapping volume sets.

In view of the foregoing, disclosed herein are a system, computer-readable medium, and method for managing the performance of a storage system. In one example, a subset of a plurality of storage units is associated with a rule that specifies a number of input and output transactions that may be executed by the subset per given unit of time and a number of bits that may be processed per given unit of time. In a further example, the associations may be adjusted in accordance with a performance policy and changes in the subset of storage units. The system, computer-readable medium, and method disclosed herein may permit different levels of the storage system to be configured, such as, but not limited to, volumes, volume sets, domains, domain sets, hosts, and host sets. In addition, the techniques disclosed herein may allow an administrator to configure a storage unit (e.g., an individual volume) with higher input/output ("IO") and bit rate limits, while configuring a set of storage units with lower limits. Such configuration allows a storage unit with higher workloads to handle the higher demand, while ensuring that the rest of the system complies with a performance policy. The aspects, features and advantages of the present disclosure will be appreciated when considered with reference to the following description of examples and accompanying figures. The following description does not limit the application; rather, the scope of the disclosure is defined by the appended claims and equivalents.

Figure 1:
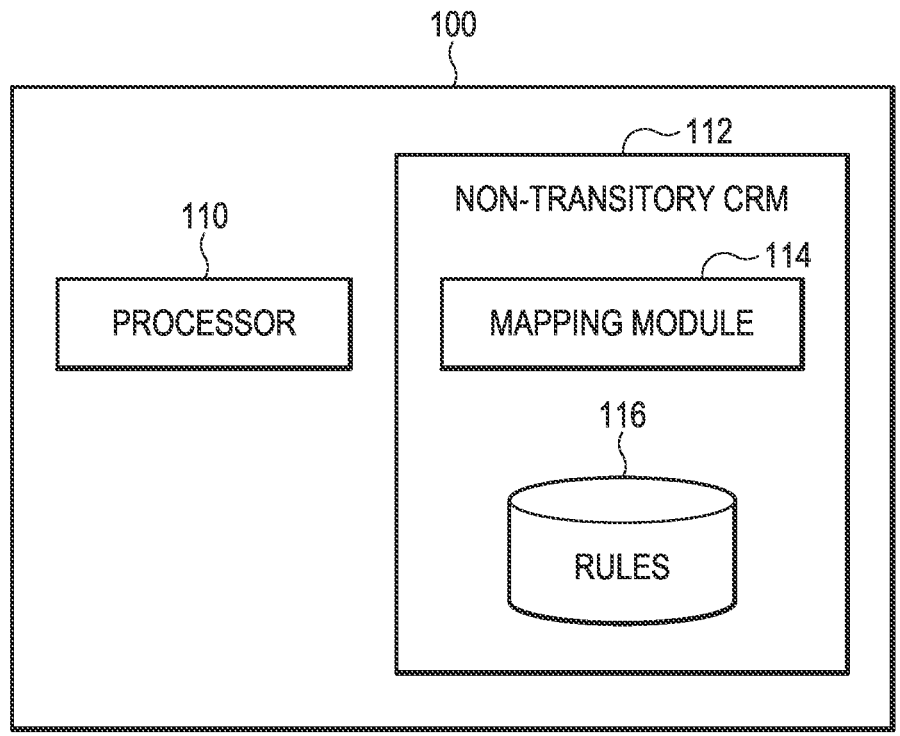
FIG. 1 is a block diagram of an example system in accordance with aspects of the present disclosure.

FIG. 1 presents a schematic diagram of an illustrative computer apparatus 100 for executing the techniques disclosed herein. The computer apparatus 100 may include all the components normally used in connection with a computer. For example, it may have a keyboard and mouse and/or various other types of input devices such as pen-inputs, joysticks, buttons, touch screens, etc., as well as a display, which could include, for instance, a CRT, LCD, plasma screen monitor, TV, projector, etc. Computer apparatus 100 may also comprise a network interface (not shown) to communicate with other devices over a network. The computer apparatus 100 may also contain a processor 110, which may be any number of well known processors, such as processors from Intel Corporation. In another example, processor 110 may be an application specific integrated circuit ("ASIC"). Non-transitory computer readable medium ("CRM") 112 may store instructions that may be retrieved and executed by processor 110. As will be discussed in more detail below, the instructions may include a mapping module 114. Furthermore, non-transitory CRM 112 may comprise data that may be retrieved by processor 110. In one example, such data may include rules database 116, which will also be discussed in more detail below. Non-transitory CRM 112 may be used by or in connection with any instruction execution system that can fetch or obtain the logic from non-transitory CRM 112 and execute the instructions contained therein.

Non-transitory computer readable media may comprise any one of many physical media such as, for example, electronic, magnetic, optical, electromagnetic, or semiconductor media. More specific examples of suitable non-transitory computer-readable media include, but are not limited to, a portable magnetic computer diskette such as floppy diskettes or hard drives, a read-only memory ("ROM"), an erasable programmable read-only memory, a portable compact disc or other storage devices that may be coupled to computer apparatus 100 directly or indirectly. Alternatively, non-transitory CRM 112 may be a random access memory ("RAM") device or may be divided into multiple memory segments organized as dual in-line memory modules ("DIMMs"). The non-transitory CRM 112 may also include any combination of one or more of the foregoing and/or other devices as well. While only one processor and one non-transitory CRM are shown in FIG. 1, computer apparatus 100 may actually comprise additional processors and memories that may or may not be stored within the same physical housing or location.

The instructions residing in non-transitory CRM 112 may comprise any set of instructions to be executed directly (such as machine code) or indirectly (such as scripts) by processor 110. In this regard, the terms "instructions," "scripts," and "applications" may be used interchangeably herein. The computer executable instructions may be stored in any computer language or format, such as in object code or modules of source code. Furthermore, it is understood that the instructions may be implemented in the form of hardware, software, or a combination of hardware and software and that the examples herein are merely illustrative.

Mapping module 114 may instruct processor 110 to after associations between rules database 116 and a subset of storage units; the change may take place in view of changes in a status of the subset. Mapping module 114 may after the association while maintaining adherence to a predetermined performance policy. As noted above, a subset of the plurality of storage units may be, for example, volumes, volume sets, domains, domain sets, hosts, and host sets.

In one example, rules database 116 may be a database of configurable rules that specify a number of IO transactions that processor 110 may execute per given time unit on a subset of a plurality of storage units and a number of bits that processor 110 may process per given time unit on the subset. In a further example, each rule may be associated with a priority such that input and output transactions are scheduled across the plurality of storage units in accordance with the priority. The priority may be in accordance with the predetermined performance policy.

Although the architecture of rules database 116 is not limited by any particular data structure, the data may be stored in computer registers, in a relational database as a table having a plurality of different fields and records, XML documents or flat files. The data may also be formatted in any computer-readable format. The data may comprise any information sufficient to identify the relevant information, such as numbers, descriptive text, proprietary codes, references to data stored in other areas of the same memory or different memories (including other network locations) or information that is used by a function to calculate the relevant data.

Figure 2:
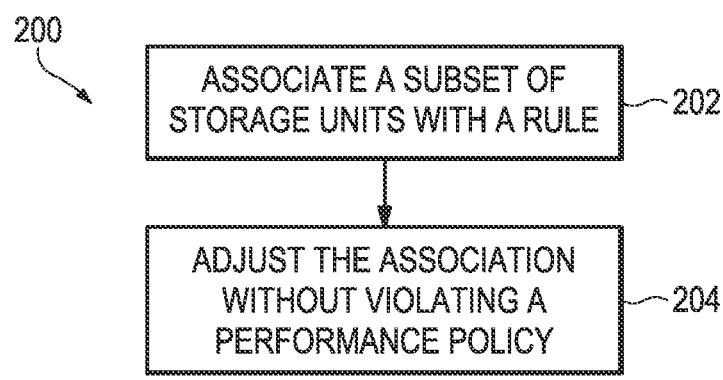
FIG. 2 is a flow diagram of an example method in accordance with aspects of the present disclosure.
Figure 3:
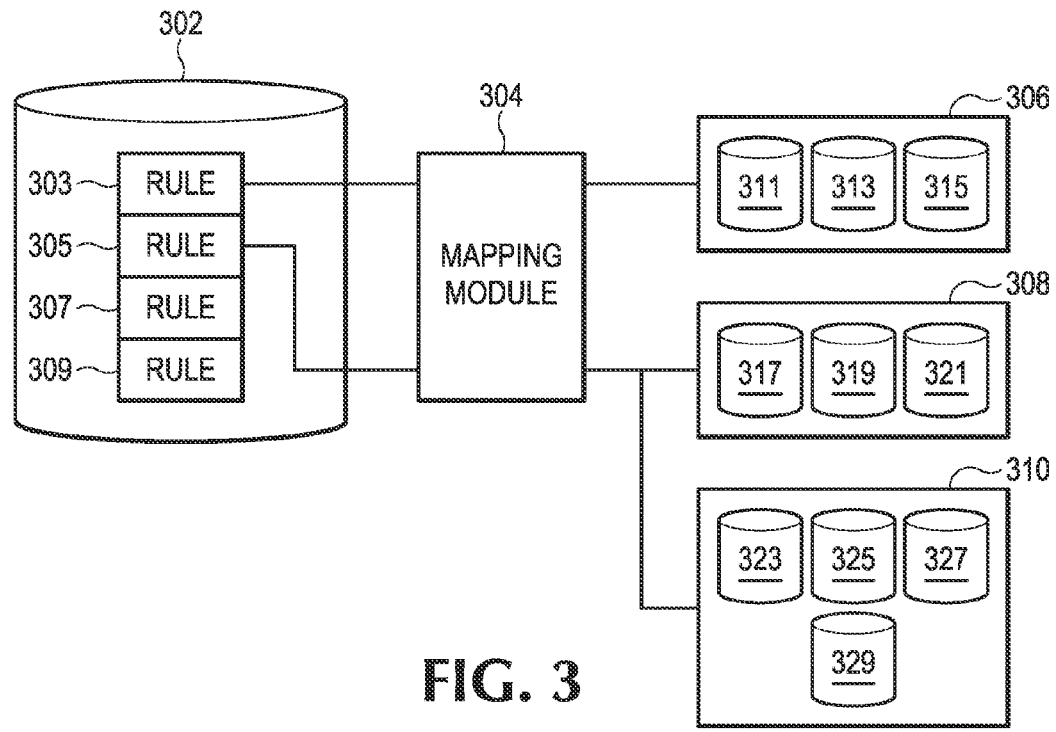
FIG. 3 is a working example in accordance with aspects of the present disclosure.
Figure 4:
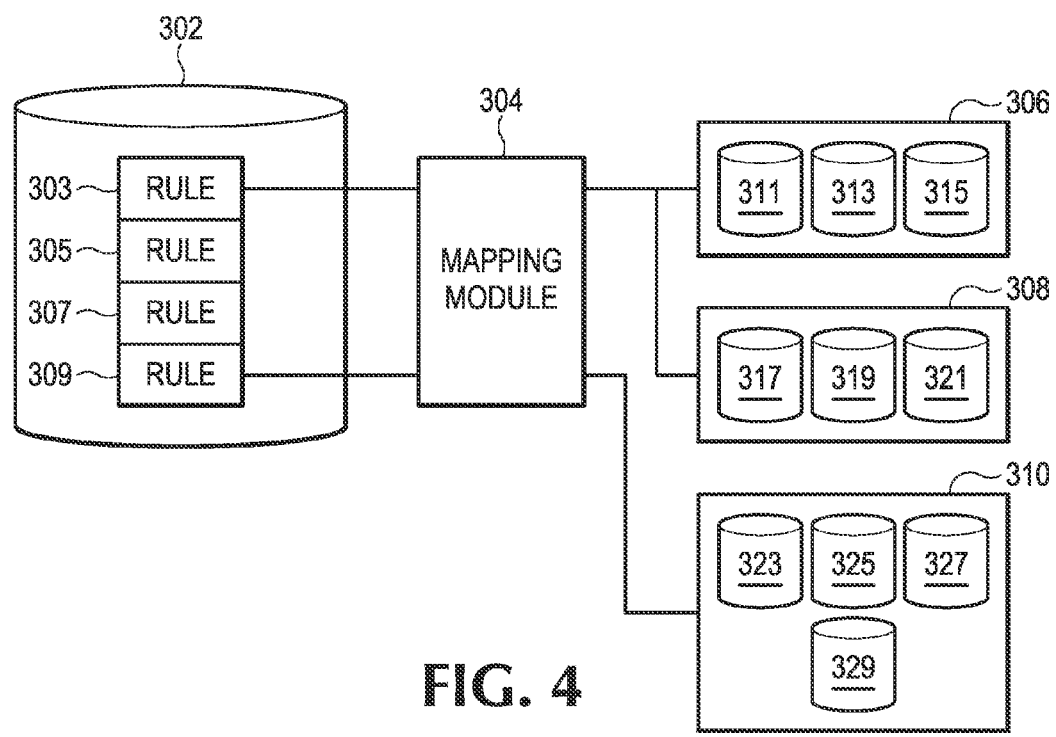
FIG. 4 is a further working example in accordance with aspects of the present disclosure.

Working examples of the system, method, and non-transitory computer-readable medium are shown in FIGS. 2-4. In particular, FIG. 2 illustrates a flow diagram of an example method 200 for managing the performance of a storage system. FIGS. 3-4 each show a working example in accordance with the techniques disclosed herein. The actions shown in FIGS. 3-4 will be discussed below with regard to the flow diagram of FIG. 2.

As shown in block 202 of FIG. 2, a subset of a plurality of storage units may be associated with a rule. Referring now to FIG. 3, three illustrative storage units are shown. In this example, the storage units are volume servers 306, 308, and 310. However, as discussed earlier, it is understood that each storage unit may be arranged as another type of logical storage unit (e.g., domains, domain sets, hosts, host sets etc.). Each volume server may comprise a logical storage unit that may be presented directly for use by a data consumer (e.g., a database application). A given volume may be associated with several physical block devices as a result of block device virtualization. In the examples of FIGS. 3-4, volume server 306 is associated with physical block devices 311,313, and 315; volume server 308 is associated with physical block devices 317, 319, and 321; and, volume server 310 is associated with physical block devices 323, 325, 327, and 329.

The associated physical block devices shown in FIG. 3 may comprise hardware or software entities that provide a collection of linearly addressed data blocks that can be read from or written to. For example, physical block devices 311, 313, and 315 of volume server 306 may collectively represent a disk drive, a fixed or removable magnetic media drive (e.g., hard drives, floppy or Zip-based drives), writable or read-only optical media drives (e.g., CD or DVD), tape drives, solid-state mass storage devices, or any other type of storage device. In another example, the physical block devices may be a storage device residing on a storage network, such as a Small Computer System Interface ("SCSI") device presented to a Storage Area Network ("SAN") using a Fibre Channel, Infiniband, or Internet Protocol ("IP") interface. In yet a further example, the physical block devices within a volume server may be a logical or virtual storage device resulting from mapping a block to one or more physical storage devices.

Each volume server 306, 308, and 310 may establish the logical arrangement of the data in their respective physical storage devices. For example, such configuration may indicate how their respective physical block devices are divided, striped, mirrored, etc. As noted above, a consumer of data may access the physical devices via the volume servers. It is understood that a given volume may be associated with several different logical or physical block devices and that the example of FIG. 3 is merely illustrative.

Mapping module 304 is shown associating rules in rules database 302 with different subsets of the volumes. In this example, mapping module 304 may associate rule 303 from rules database 302 with volume server 306. The example of FIG. 3 also shows mapping module 304 associating rule 305 with volume servers 308 and 310. Thus, instead of having a one to one relationship between a rule and a storage unit, the relationship may be one-to-many or even many-to-many. Such flexibility allows the configuration be more dynamic and provides a file system administrator with more options.

Referring back to FIG. 2, the associations may be adjusted without violating a performance policy, as shown in block 204. In one example, the adjustment may be in accordance with a status of a subset of the storage units. The status monitoring of a subset of storage units may be carried out using conventional monitoring tools, such as, for example, the system activity report ("SAR") tool available in a UNIX environment. Mapping module 304 may assess the workload of a subset in view of the configuration rules and a predetermined performance policy. Referring back to FIG. 3, mapping module 304 may determine that rule 305 prevents volume server 310 from carrying out a particular operation. That is, the IO and bit rate limitation imposed by rule 305 is less than what volume server 310 needs to execute a particular operation or a series of operations. In this instance, mapping module 304 may adjust the association while ensuring that a performance policy is not violated. Such an adjustment may include increasing the IO and bit rate specified by rule 305; however, rule 305 is also associated with volume server 308. While increasing the IO and bit rate of rule 305 may permit volume server 310 to execute an operation, it may also cause a violation of a performance policy, since the adjustment would also increase the IO and bit rate of volume server 308.

Referring now to FIG. 4, new associations between rules in rules database 302 and volume servers 306, 308, and 310 are shown. In this example, mapping module 304 may associate rule 303 with volume servers 306 and 308. Furthermore, mapping module 304 may associate rule 309 with volume server 310. Rule 309 may specify an IO and bit rate high enough to allow volume server 310 to handle the heavier workload it's experiencing. Meanwhile, rule 303 may specify a lower IO and bit rate for volume servers 306 and 308 such that the performance policy is not violated. FIGS. 3 and 4 demonstrate how mapping module 304 may adjust the associations in accordance with increases in workloads of particular subsets of storage units.

Advantageously, the foregoing system, method, and non-transitory computer readable medium allow the performance of a system of storage units to be dynamically adjusted while staying within the limits specified by a performance policy. In this regard, rather than having a fixed configuration, changes may be made without adversely affecting other aspects of the system expecting a certain level of performance. In turn, users may experience stable and steady performance of their critical applications.

Although the disclosure herein has been described with reference to particular examples, it is to be understood that these examples are merely illustrative of the principles of the disclosure. It is therefore to be understood that numerous modifications may be made to the examples and that other arrangements may be devised without departing from the spirit and scope of the disclosure as defined by the appended claims. Furthermore, while particular processes are shown in a specific order in the appended drawings, such processes are not limited to any particular order unless such order is expressly set forth herein; rather, processes may be performed in a different order or concurrently and steps may be added or omitted.

The invention claimed is:

1. A system comprising:
    a plurality of storage units;
    a plurality of different configurable rules, each respective configurable rule of the plurality of different configurable rules specifying a number of input and output transactions that at least one processor may execute per time unit on a respective subset of the plurality of storage units, and a number of bits that at least one processor may process per time unit on the respective subset; and
    a non-transitory storage medium storing mapping instructions executable on a processor to alter associations between the plurality of different configurable rules and the plurality of storage units in response to a change in a status of a first subset of the plurality of storage units, while maintaining adherence to a predetermined performance policy, wherein the first subset of the plurality of storage units is associated with a first configurable rule of the plurality of different configurable rules prior to the change, and the altering of the associations comprises establishing a new association that associates a storage unit in the first subset of the plurality of storage units with a second configurable rule of the plurality of different configurable rules in response to the change, the second configurable rule different from the first configurable rule.

2. The system of claim 1, wherein each configurable rule is associated with a priority such that, when at least one processor schedules input and output transactions across the plurality of storage units, the scheduling of the input and output transactions is in accordance with the priority.

3. The system of claim 2, wherein the priority associated with each configurable rule is based on the predetermined performance policy.

4. The system of claim 1, wherein each subset of the plurality of storage units is arranged as a logical storage unit.

5. The system of claim 4, wherein the logical storage unit comprises a volume, a volume set, a domain, a domain set, or a host.

6. The system of claim 1, wherein the first subset of the plurality of storage units includes either:
    one storage unit, or
    multiple storage units.

7. The system of claim 1, wherein the first subset includes a first logical storage unit and a second logical storage unit, wherein the change in status of the first subset of the plurality of storage units is a change in status of the first logical storage unit, and wherein the new association associates the first logical storage unit with the second configurable rule.

8. The system of claim 7, wherein the new association further associates the second logical storage unit with a third configurable rule of the plurality of different configurable rules, the third configurable rule different from each of the first and second configurable rules.

9. The system of claim 8, wherein the third configurable rule is further associated with a second subset of the plurality of storage units prior to the change.

10. A non-transitory computer readable medium having instructions that upon execution cause a system to:
    associate a first subset of a plurality of storage units with a first rule of a plurality of different rules, each respective rule of the plurality of different rules specifying a number of input and output transactions that a respective subset of the plurality of storage units may execute per time unit and a number of bits that the respective subset may process per time unit;
    detect a change in a status of the first subset;
    in response to the change, adjust an association for the first subset by associating the first subset with a second rule of the plurality of different rules; and
    check that the adjustment does not violate a predetermined performance policy.

11. The non-transitory computer readable medium of claim 10, wherein each rule of the plurality of different rules is associated with a priority such that a schedule of input and output transactions across the plurality of storage units is in accordance with the priority.

12. The non-transitory computer readable medium of claim 11, wherein the priority associated with each rule of the plurality of different rules is based on the predetermined performance policy.

13. The non-transitory computer readable medium of claim 10, wherein the first subset of the plurality of storage units is arranged as a logical storage unit.

14. The non-transitory computer readable medium of claim 13, wherein the logical storage unit comprises a volume, a volume set, a domain, a domain set, or a host.

15. The non-transitory computer readable medium of claim 10, wherein the instructions upon execution cause the system to:
    in response to the change in the status of the first subset, maintain unchanged an association of a second subset of the plurality of storage units with a third rule of the plurality of different rules.

16. A method comprising
    determining, by a system comprising a computer processor, a performance policy for a plurality of storage units;
    associating, by the system, a first subset of the plurality of storage units with a first performance rule of a plurality of different performance rules that each specifies a number of input and output transactions that a respective subset of the plurality of storage units may execute per time unit and a number of bits that the respective subset may process per time unit;
    determining, by the system, whether the first performance rule prevents the first subset from carrying out an operation; and
    in response to determining that the first performance rule prevents the first subset from carrying out the operation, adjusting, by the system, an association of performance rules by associating the first subset with a second performance rule of a plurality of different performance rules to execute the operation without causing a violation of a performance policy.

17. The method of claim 16, wherein each performance rule of the plurality of different performance rules is associated with a priority such that a schedule of input and output transactions across the plurality of storage units is in accordance with the priority.

18. The method of claim 17, wherein the priority associated with each rule of the plurality of different performance rules is based on the performance policy.

19. The method of claim 16, wherein the first subset of the plurality of storage units is arranged as a logical storage unit.

20. The method of claim 16, wherein the first subset includes either:
 a single logical unit, or
 multiple logical units.

* * * * *